United States Patent
Kim et al.

(10) Patent No.: US 10,013,123 B2
(45) Date of Patent: Jul. 3, 2018

(54) TOUCH SCREEN DEVICE AND METHOD OF DRIVING THE SAME

(71) Applicant: LG Display Co., Ltd., Seoul (KR)

(72) Inventors: SungChul Kim, Goyang-si (KR); CheolSe Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/942,370

(22) Filed: Nov. 16, 2015

(65) Prior Publication Data

US 2016/0188041 A1 Jun. 30, 2016

(30) Foreign Application Priority Data

Dec. 31, 2014 (KR) .................. 10-2014-0194594

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
None
See application file for complete search history.

(56) References Cited

U.S. PATENT DOCUMENTS

2015/0002176 A1* 1/2015 Kwon, II .............. G06F 3/0416
324/679
2015/0346879 A1* 12/2015 Jeong ...................... G06F 3/044
345/174
2016/0117017 A1* 4/2016 Kremin .............. G01R 27/2605
345/174

FOREIGN PATENT DOCUMENTS

| CN | 101739186 | 6/2010 |
| CN | 103440073 | 12/2013 |
| CN | 103488362 | 1/2014 |

OTHER PUBLICATIONS

First Office Action for Chinese Patent Application No. CN 201510795848.2, dated Feb. 14, 2018, 12 Pages (With English Translation).

* cited by examiner

*Primary Examiner* — Jennifer Mehmood
*Assistant Examiner* — Krishna Neupane
(74) *Attorney, Agent, or Firm* — Fenwick & West LLP

(57) ABSTRACT

Disclosed are a touch screen device and a method of driving the same, which minimize an influence of parasitic capacitance of a touch electrode and sense a voltage charged into capacitance(s) of the touch electrode. The touch screen device includes a touch electrode, a touch driving line connected to the touch electrode, a touch driving voltage output unit connected to the touch driving line through a first switch to output a touch driving voltage, a current source connected to the touch driving line through a second switch to discharge electrical charges charged into parasitic capacitance of the touch electrode according to a predetermined discharge current, and a touch voltage sensing unit connected to the touch driving line through a third switch to sense a voltage charged into each of finger capacitance and the parasitic capacitance of the touch electrode.

9 Claims, 10 Drawing Sheets

TOUCH SCREEN DEVICE AND METHOD OF DRIVING THE SAME

CROSS-REFERENCE TO RELATED APPLICATIONS

This application claims the benefit of the Korean Patent Application No. 10-2014-0194594 filed on Dec. 31, 2014, which is hereby incorporated by reference as if fully set forth herein.

BACKGROUND

Field of the Invention

Embodiments of the present invention relate to a touch screen device and a method of driving the same.

Discussion of the Related Art

Recently, various input devices such as mouse devices, trackballs, joysticks, digitizers, etc. are being used for providing an interface between users and home appliances or various information communication devices. Therefore, the demands for input devices which are convenient and simple and reduce the number of malfunctions are progressively increasing. In order to satisfy the demands, touch screen devices which enable a user to input information by directly touching a screen with a finger, a pen, or the like have been proposed. The touch screen devices are input devices that are conversationally and intuitively manipulated by merely touching a button displayed by a display unit with a finger, and thus, are easily used by men and women of all ages. Therefore, the touch screen devices are being widely applied to various devices, for example, portable display devices such as smartphones, tablet personal computers (PCs), portable multimedia players (PMPs), etc.

When a touch screen device is implemented in an in-cell type where the touch electrodes are provided in a display panel that displays an image, the touch electrodes may be disposed adjacent to pixel electrodes of pixels of the display panel and a plurality of driving lines connected to the pixels. Parasitic capacitances are formed between the touch electrodes and pixel electrodes and the driving lines, and finger capacitances are formed between the touch electrodes and a finger or a pen of a user. That is, a parasitic capacitance and a finger capacitance are formed in a touch electrode which is touched, but only a parasitic capacitance is formed in a touch electrode which is not touched. There is a difference between an electrical charge charged into each of a parasitic capacitance and a finger capacitance, which are formed in a touch electrode which is touched, and an electrical charge charged into a parasitic capacitance formed in a touch electrode which is not touched, and the touch screen device may determine which of the touch electrodes is touched, based on the difference.

However, a size of a parasitic capacitance is far greater than that of a finger capacitance. Therefore, a difference between an electrical charge charged into each of a parasitic capacitance and a finger capacitance, which are formed in a touch electrode which is touched, and an electrical charge charged into a parasitic capacitance is formed in a touch electrode which is not touched is very small. That is, a difference between a voltage sensed from a touched touch electrode and a voltage sensed from an untouched touch electrode is small. As a result, an accuracy of touch sensing is reduced.

SUMMARY

Accordingly, the present invention is directed to provide a touch screen device and a method of driving the same that substantially obviate one or more problems due to limitations and disadvantages of the related art.

An aspect of the present invention is directed to provide a touch screen device and method of driving the same, which minimize an influence of parasitic capacitance of a touch electrode and sense a voltage charged into capacitance(s) of the touch electrode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch screen device including a touch electrode, a touch driving line connected to the touch electrode, a touch driving voltage output unit connected to the touch driving line through a first switch to output a touch driving voltage, a current source connected to the touch driving line through a second switch to discharge electrical charges charged into parasitic capacitance of the touch electrode according to a predetermined discharge current, and a touch voltage sensing unit connected to the touch driving line through a third switch and configured to sense a voltage charged into each of finger capacitance and the parasitic capacitance of the touch electrode.

In another aspect of the present invention, there is provided a method of driving a touch screen device including charging parasitic capacitance and finger capacitance of a touch electrode with a touch driving voltage, discharging electrical charges charged into the parasitic capacitance of the touch electrode according to a predetermined discharge current during a predetermined period, and sensing a voltage charged into each of the parasitic capacitance and finger capacitance of the touch electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Figure 1:
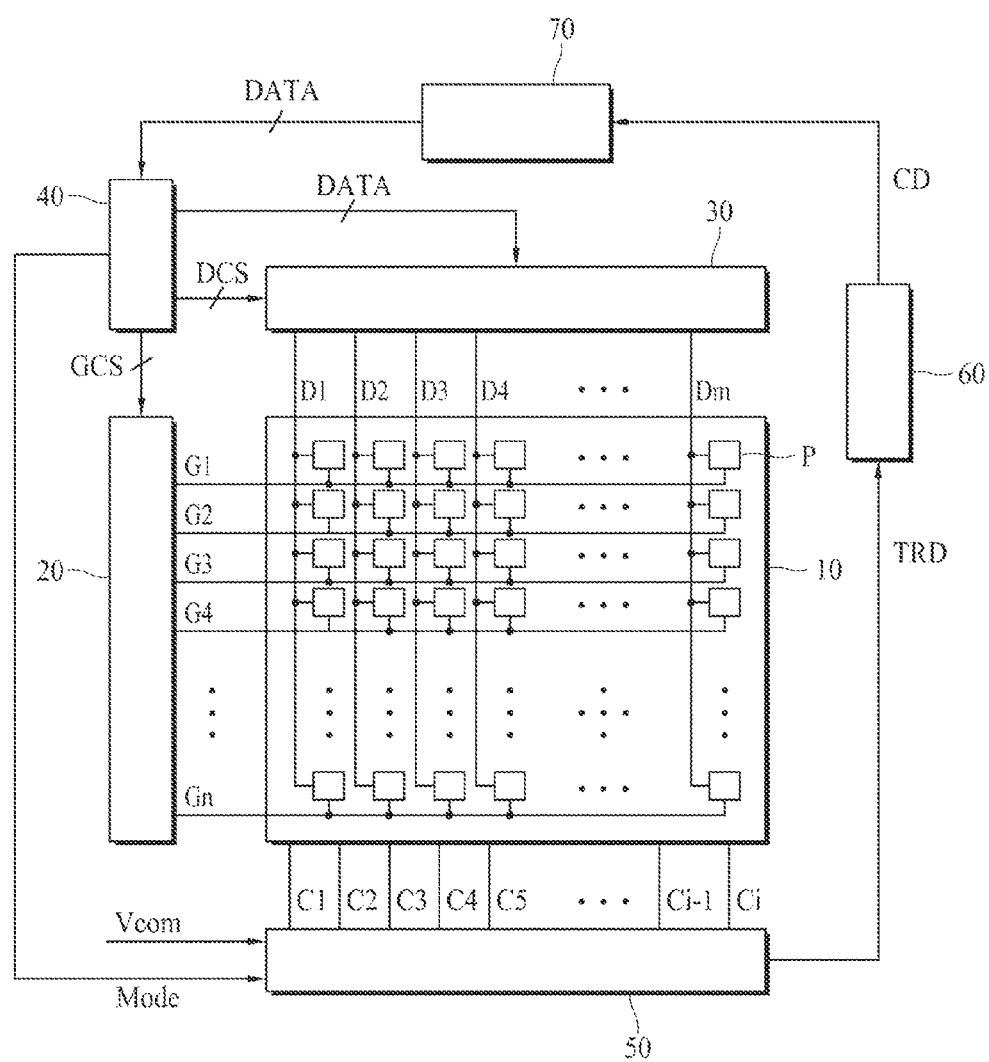
FIG. 1 is a block diagram illustrating in detail a touch screen device according to an embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, some embodiments of the present invention will be described in detail with reference to the accompanying drawings. In the specification, like reference numerals refer to like elements. In the following description, when the detailed description of the relevant known function or configuration is determined to unnecessarily obscure the important point of the present invention, the detailed description will be omitted. A name of each of elements used herein is selected in consideration of easiness of description of the specification and may differ from a name of an actual product.

Figure 2:
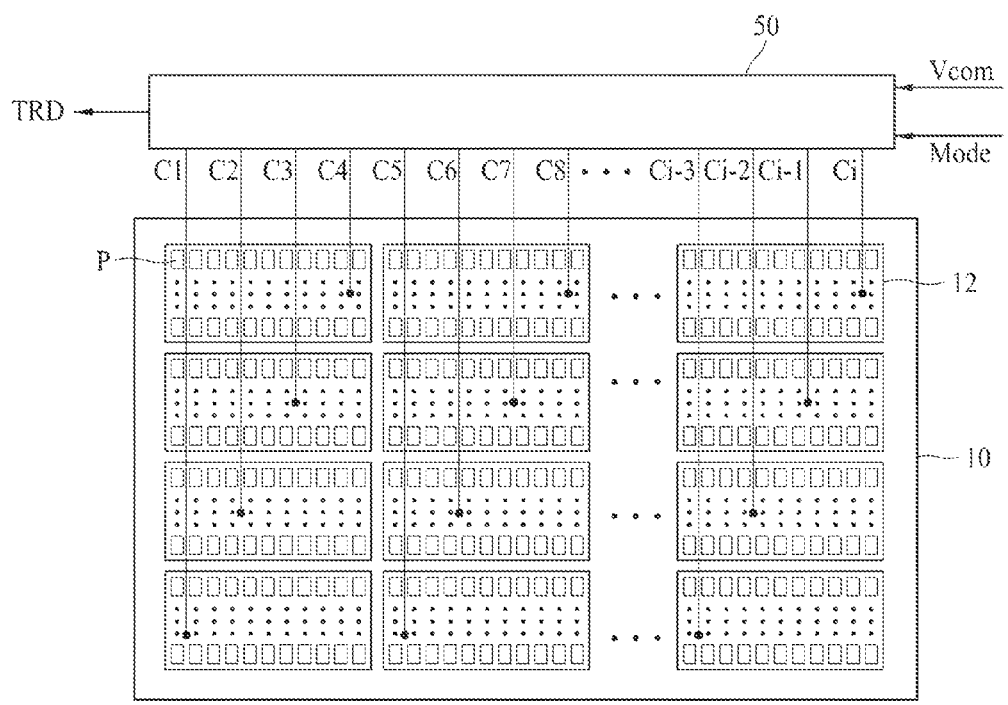
FIG. 2 is an exemplary diagram illustrating a plurality of pixels, a plurality of touch electrodes, and a plurality of touch driving lines which are included in a display panel and a touch driver illustrated in FIG. 1.
Figure 3:
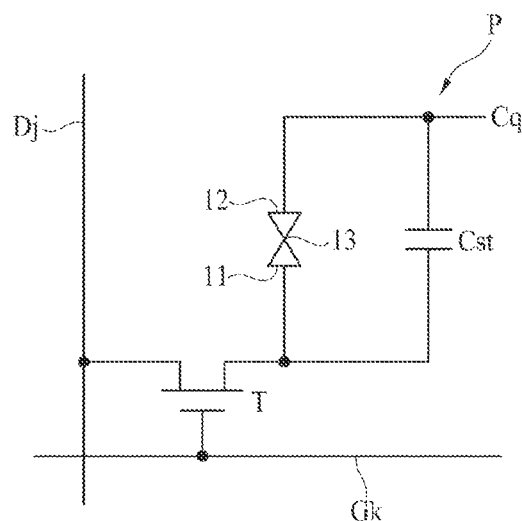
FIG. 3 is an exemplary diagram illustrating a pixel of FIG. 2 in detail.

FIG. 1 is a block diagram illustrating in detail a touch screen device according to an embodiment of the present invention. FIG. 2 is an exemplary diagram illustrating a plurality of pixels, a plurality of touch electrodes, and a plurality of touch driving lines which are included in a display panel and a touch driver illustrated in FIG. 1. FIG. 3 is an exemplary diagram illustrating a pixel of FIG. 2 in detail. Hereinafter, a liquid crystal display (LCD) device according to an embodiment of the present invention will be schematically described with reference to FIGS. 1 to 3.

The touch screen device according to an embodiment of the present invention will be described as being implemented in a self-capacitance type, but is not limited thereto. That is, the touch screen device according to an embodiment of the present invention may be implemented in another capacitance type such as a mutual capacitance type or the like.

Moreover, the touch screen device according to an embodiment of the present invention will be described as being implemented in an in-cell type where a plurality of touch electrodes are included in a display panel 10, but is not limited thereto. That is, the touch screen device according to an embodiment of the present invention may be implemented in an on-cell type where the plurality of touch electrodes are provided on the display panel 10.

Furthermore, the touch screen device according to an embodiment of the present invention will be described as being an LCD device, but is not limited thereto. That is, the touch screen device according to an embodiment of the present invention may be implemented as an organic light emitting display device, a plasma display device, an electrophoresis display device, or the like.

The touch screen device according to an embodiment of the present invention, as illustrated in FIG. 1, may include the display panel 10, a gate driver 20, a data driver 30, a timing controller 40, a touch driver 50, a touch coordinate calculator 60, and a main processor 70.

The display panel 10 may include a lower substrate, an upper substrate, and a liquid crystal layer disposed between the lower substrate and the upper substrate. A plurality of data lines D1 to Dm (where m is a positive integer equal to or more than two), a plurality of gate lines G1 to Gn (where n is a positive integer equal to or more than two), and a plurality of touch driving lines C1 to Ci (where i is a positive integer equal to or more than two) may be disposed on the lower substrate of the display panel 10.

A plurality of pixels P, as illustrated in FIG. 1, may be respectively provided in a plurality of areas defined by intersections of the data lines D1 to Dm and the gate lines G1 to Gn. Each of the pixels P may be connected to a corresponding data line and a corresponding gate line. Each of the pixels P, as illustrated in FIG. 3, may include a transistor T, a pixel electrode 11, a liquid crystal cell 13, and a storage capacitor Cst. The transistor T may be turned on by a gate signal of a kth gate line Gk (where k is a positive integer satisfying "$1 \leq k \leq n$") to supply a data voltage of a jth data line Dj (where j is a positive integer satisfying "$1 \leq j \leq m$") to the pixel electrode 11. The touch electrode 12 may receive a common voltage from one touch driving line Cq of the touch driving lines C1 to Ci. When the common voltage is supplied to the touch electrode 12, the touch electrode 12 may act as a common electrode. Therefore, each of the pixels P may drive liquid crystal of the liquid crystal cell 13 according to an electric field which is generated based on a potential difference between the data voltage supplied to the pixel electrode 11 and the common voltage supplied to the touch electrode 12, thereby adjusting a transmission amount of light incident from a backlight unit. As a result, the pixels P may display an image. Also, the storage capacitor Cst may be provided between the pixel electrode 11 and the touch electrode 12 to maintain a constant voltage difference between the pixel electrode 11 and the touch electrode 12.

A plurality of touch electrodes 12, as illustrated in FIG. 2, may be disposed in the display panel 10. Each of the touch electrodes 12 may be disposed to overlap s (where s is a positive integer equal to or more than two) number of pixels. A size of each of the touch electrodes 12 may be set based on a contact area of a finger, a contact area of a pen, and/or the like.

Figure 4:
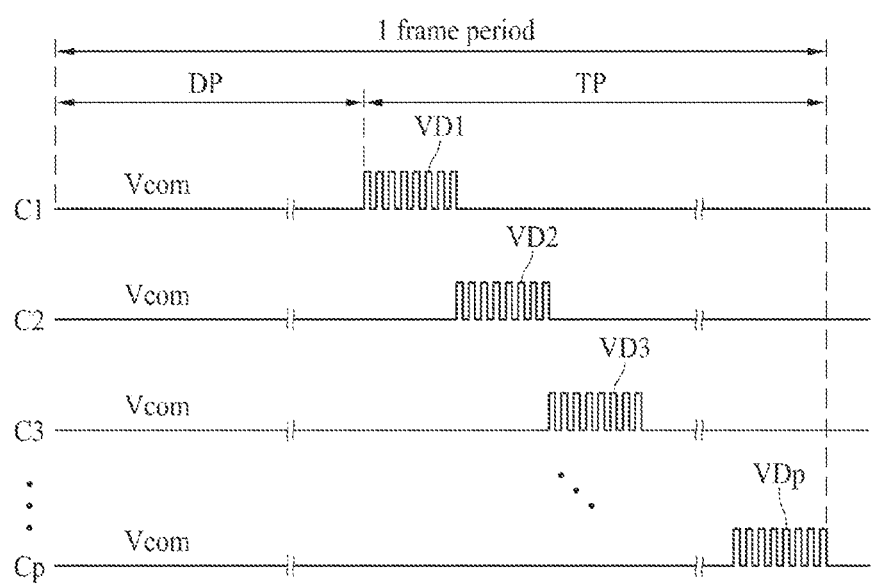
FIG. 4 is a waveform diagram showing signals which are supplied to a plurality of touch driving lines during one frame period.

Each of the touch electrodes 12, as illustrated in FIG. 2, may be connected to one of the touch driving lines C1 to Ci. The touch driving lines C1 to Ci may be connected to the respective touch electrodes 12 and the touch driver 50. As shown in FIG. 4, the touch electrodes 12 may receive the common voltage Vcom from the touch driver 50 through the respective touch driving lines C1 to Ci during a display driving period DP, and during a touch sensing period TP, the touch electrodes 12 may be respectively supplied with touch driving voltages VD1 to VDp. When the common voltage Vcom is applied to the touch electrodes 12, each of the touch electrodes 12 may act as a common electrode. Each of the touch driving lines C1 to Ci, as illustrated in FIG. 2, may be disposed between two adjacent pixels.

A black matrix and a color filter may be disposed on the upper substrate of the display panel 10. However, when the display panel 10 is implemented in a color filter on TFT (COT) structure, the black matrix and the color filter may be disposed on the lower substrate of the display panel 10.

A polarizer may be attached to each of the upper substrate and lower substrate of the display panel 10, and an alignment layer for adjusting a pre-tilt angle of the liquid crystal may be disposed on the upper substrate and lower substrate of the display panel 10. A column spacer for maintaining a cell gap of the liquid crystal cell may be disposed between the upper substrate and lower substrate of the display panel 10.

The backlight unit may be disposed under a bottom of the lower substrate of the display panel 10. The backlight unit may be implemented in an edge type or a direct type and may irradiate light onto the display panel 10.

The gate driver 20 may generate gate signals according to a gate control signal GCS input from the timing controller 40. The gate driver 20 may supply the gate signals to the gate lines G1 to Gn in a predetermined order during the display driving period DP. The predetermined order may be a sequential order. The gate driver 20 may not supply the gate signals to the gate lines G1 to Gn during the touch sensing period TP.

The data driver 30 may receive digital video data DATA and a data control signal DCS from the timing controller 40. The data driver 30 may convert the digital video data DATA into analog data voltages according to the data control signal DCS. The data driver 30 may supply the data voltages to the data lines D1 to Dm during the display driving period DP, respectively. The data driver 30 may not supply the data voltages to the data lines D1 to Dm during the touch sensing period TP.

The timing controller 40 may receive the digital video data DATA and a plurality of timing signals TS from the main processor 70. The timing signals TS may include a vertical synchronization signal, a horizontal synchronization signal, a data enable signal, a dot clock, etc. The vertical synchronization signal may be a signal defining one frame period. The horizontal synchronization signal may be a signal defining one horizontal period where data voltages are respectively supplied to pixels disposed on one horizontal line of the display panel 10. The pixels disposed on the one horizontal line may be connected to the same gate line. The data enable signal may be a signal defining a period where valid digital video data is supplied. The dot clock may be a signal which is shortly repeated at predetermined intervals.

The timing controller 40, as shown in FIG. 4, may divide one frame period into the display driving period DP and the touch sensing period TP. During the display driving period DP, the timing controller 40 may control the gate driver to supply the gate signals to the gate lines G1 to Gn and may control the data driver 30 to respectively supply data voltages to the data lines D1 to Dm. In FIG. 4, it is illustrated that one frame period includes one display driving period DP and one touch sensing period TP, but the present embodiment is not limited thereto. That is, one frame period may include a plurality of display driving periods DP and a plurality of touch sensing periods TEq.

The timing controller 40 may generate a gate control signal GCS for controlling an operation timing of the gate driver 20 and a data control signal DCS for controlling an operation timing of the data driver 30, based on the timing signals. The timing controller 40 may output the gate control signal GCS to the gate driver 20 and may output the digital video data DATA and the data control signal DCS to the data driver 30.

The timing controller 40 may generate a mode signal MODE for distinguishing the display driving period DP and the touch sensing period TP. The timing controller 40 may output the mode signal MODE to the touch driver 50.

The touch driver 50 may receive the mode signal MODE from the timing controller 40, receive a touch control signal TCS from the touch coordinate calculator 60, and receive the common voltage Vcom from a power supply source.

The touch driver 50, as shown in FIG. 4, may divide one frame period into the display driving period DP and the touch sensing period TP according to the mode signal MODE and may operate in one of the divided periods. When the mode signal MODE corresponding to a first logic level voltage is input, as shown in FIG. 4, the touch driver 50 may supply the common voltage Vcom to the touch driving lines C1 to Ci during the display driving period DP. When the mode signal MODE corresponding to a second logic level voltage is input, the touch driver 50 may generate touch driving voltages VD1 to VDp according to the touch control signal TCS during the touch sensing period TP. The touch driver 50, as shown in FIG. 4, may respectively supply the touch driving voltages VD1 to VDp to the touch driving lines C1 to Ci in a predetermined order during the touch sensing period TP. The predetermined order, as shown in FIG. 4, may be a sequential order. In FIG. 4, it is described that the touch driving voltages VD1 to VDp have a level higher than that of the common voltage Vcom, but the present embodiment is not limited thereto. Each of the touch driving voltages VD1 to VDp, as shown in FIG. 4, may include a plurality of pulses. The touch driver 50 may convert a plurality of sensing signals, received from the touch electrodes 12, into touch raw data TRD and may output the touch raw data TRD to the touch coordinate calculator 60.

An operation of the touch driver 50 which is performed during the touchسensing period TP will be described in detail with reference to FIGS. 5 to 7 and 8A to 8D.

The touch coordinate calculator 60 may receive the touch raw data TRD from the touch driver 50. When the touch raw data TRD equal to or more than a first reference value is input, the touch coordinate calculator 60 may determine that a user touch is performed and may calculate, as touch coordinates, coordinates of the touch electrode 12 corresponding to the touch raw data TRD equal to or more than the first reference value. The touch coordinate calculator 60 may output touch coordinate data CD including touch coordinate information to the main processor 70.

The main processor 70 may be implemented as a central processing unit (CPU), a host processor, an application processor, or a graphic processing unit (GPU) of one of a navigation system, a set-top box, a DVD player, a blue-ray player, a personal computer (PC), a notebook computer, a home theater system, a broadcasting receiver, a smartphone, a table PC, a mobile terminal, etc.

The main processor 70 may convert the digital video data DATA into data having a format suitable to be displayed by the display panel 10 and may transfer the data, obtained through the conversion, to the timing controller 40. The main processor 70 may receive the touch coordinate data CD from the touch coordinate calculator 60. The main processor 70 may execute an execution program or an application program of an icon corresponding to touch coordinates according to the touch coordinate data CD and may transfer the digital video data DATA and the timing signals TS based on the executed program to the timing controller 40.

Figure 5:
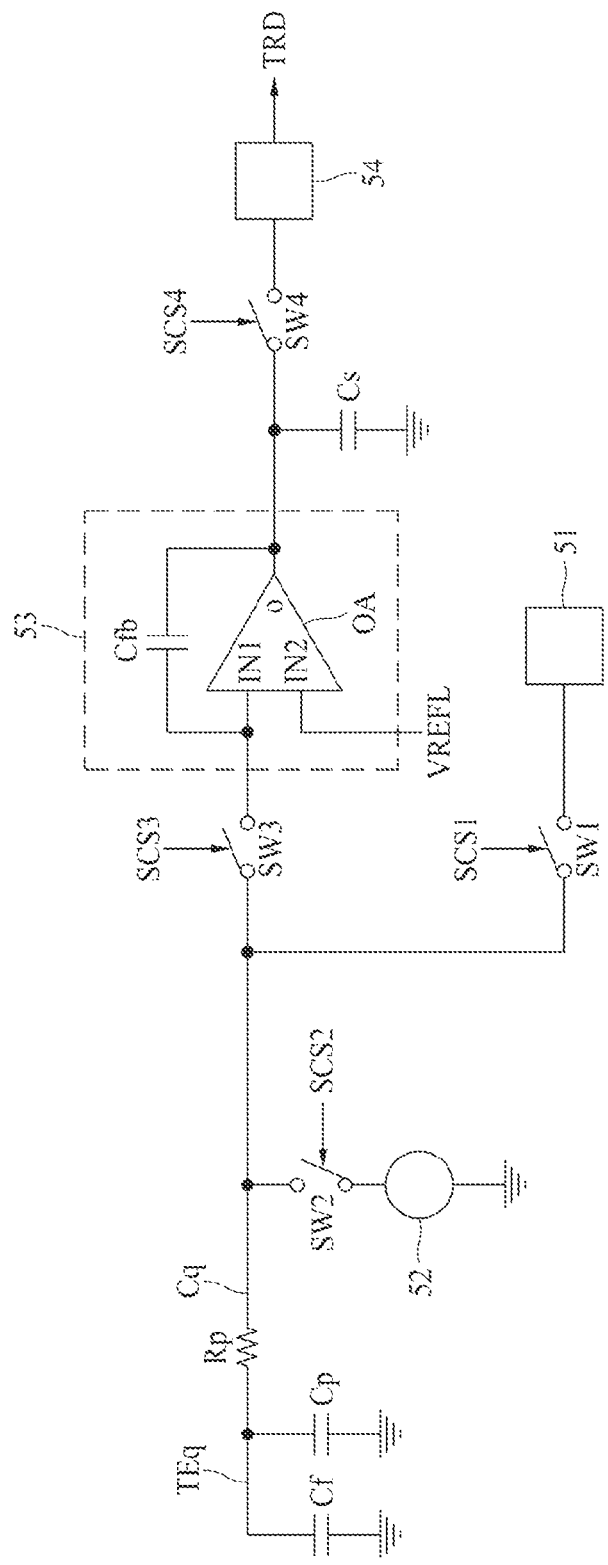
FIG. 5 is a circuit diagram illustrating a qth touch driving line and a touch driving voltage output unit, a current supply source, a touch voltage sensing unit, and an analog-to-digital converter of a touch driver connected to the qth touch driving line.

FIG. 5 is a circuit diagram illustrating a qth touch driving line and a touch driving voltage output unit, a current supply source, a touch voltage sensing unit, and an analog-to-digital converter of a touch driver connected to the qth touch driving line. Referring to FIG. 5, the touch driver 50 may include a plurality of touch driving voltage output units 51, a plurality of current sources 52, a plurality of touch voltage sensing units 53, and a plurality of analog-to-digital converters (ADCs) 54. In FIG. 5, for convenience of description, a qth touch driving line Cq (where q is a positive integer satisfying "1≤q≤i") and only a touch driving voltage output unit 51, a current source 52, a touch voltage sensing unit 53, and an ADC 54 which are connected to the qth touch driving line Cq are illustrated. The touch driving voltage output unit 51 may be connected to the touch driving lines C1 to Ci and may output the touch driving voltages VD1 to VDp in a predetermined order. The current sources 52 may be connected to the touch driving lines C1 to Ci in one-to-one correspondence relationship, and the touch voltage sensing units 53 may be connected to the touch driving lines C1 to Ci in one-to-one correspondence relationship. The ADCs 54 may be connected to the touch voltage sensing units 53 in one-to-one correspondence relationship.

A touch electrode TEq may be connected to the qth touch driving line Cq. In FIG. 5, reference numeral "Rp" denotes a resistance of the qth touch driving line Cq. The touch electrode TEq, as illustrated in FIG. 2, may overlap a plurality of gate lines, a plurality of data lines, or other touch driving lines in addition to a plurality of pixels P, and thus, as illustrated in FIG. 5, a parasitic capacitance Cp may be formed between the touch electrode TEq and pixel electrodes of the plurality of pixels P and between the touch electrode TEq and the plurality of gate lines, the plurality of data lines, or the other touch driving lines. Also, as illustrated in FIG. 5, finger capacitance Cf may be formed between the touch electrode TEq and a user's finger or a pen. The parasitic capacitance Cp and the finger capacitance Cf may be formed in the touch electrode TEq which is touched, but only the parasitic capacitance Cp may be formed in a touch electrode which is not touched. In FIG. 5, for convenience of description, only the touch electrode TEq which is touched is illustrated.

A size of the parasitic capacitance Cp is far greater than that of the finger capacitance Cf. Therefore, a difference between an electrical charge charged into each of the parasitic capacitance Cp and the finger capacitance Cf, which are formed in the touch electrode TEq which is touched, and an electrical charge charged into the parasitic capacitance Cp formed in a touch electrode which is not touched is very small. That is, since a difference between a voltage sensed from the touched touch electrode TEq and a voltage sensed from an untouched touch electrode is small, an accuracy of touch sensing is reduced.

However, in an embodiment of the present invention, some of electrical charges charged into the parasitic capacitance Cp may be discharged before sensing a voltage charged into the parasitic capacitance Cp and finger capacitance Cf of the touch electrode TEq, thereby minimizing an influence of the parasitic capacitance Cp. As a result, in an embodiment of the present invention, an influence of the parasitic capacitance Cp of the touch electrode TEq may be minimized, and a voltage charged into the finger capacitance Cf of the touch electrode TEq may be sensed, thereby increasing an accuracy of touch sensing. This will be described in detail with reference to FIGS. 8A to 8D.

The touch driving voltage output unit 51 may be connected to the qth touch driving line Cq through a first switch SW1. The first switch SW1 may be turned on by a first switch signal SCS1 to control a connection between the touch driving voltage output unit 51 and the qth touch driving line Cq. The touch driving voltage output unit 51 may be connected to the qth touch driving line Cq during a period where the first switch SW1 is turned on, and thus may supply a touch driving voltage to the touch electrode TEq through the qth touch driving line Cq.

The current source 52 may be connected between a second switch SW2 and a ground voltage source. The current source 52 may be connected to the qth touch driving line Cq through the second switch SW2. The second switch SW2 may be turned on by a second switch signal SCS2 to control a connection between the current source 52 and the qth touch driving line Cq. The current source 52 may be connected to the qth touch driving line Cq during a period where the second switch SW2 is turned on, and thus may supply a predetermined discharge current "−id" to the qth touch driving line Cq. Therefore, some of electrical charges charged into the parasitic capacitance Cp of the touch electrode TEq may be discharged during the period where the second switch SW2 is turned on.

The touch voltage sensing unit 53 may be connected to the qth touch driving line Cq through a third switch SW3. The third switch SW3 may be turned on by a third switch signal SCS3 to control a connection between the touch voltage sensing unit 53 and the qth touch driving line Cq. The touch voltage sensing unit 53 may be connected to the qth touch driving line Cq during a period where the third switch SW3 is turned on, and thus may sense, through the qth touch driving line Cq, a voltage Va charged into each of the parasitic capacitance Cp and finger capacitance Cf of the touch electrode TEq.

The touch voltage sensing unit 53 may include an operational amplifier OA and a feedback capacitor Cfb. The operational amplifier OA may include a first input terminal Ni, a second input terminal IN2, and an output terminal o. The first input terminal IN1 of the operational amplifier OA may be connected to the qth touch driving line Cq through the third switch SW3, the second input terminal IN2 may be connected to an initialization voltage line VREFL through which an initialization voltage is supplied, and the output terminal o may be connected to a sensing capacitor Cs. The sensing capacitor Cs may be connected between the output terminal o and the ground voltage source to be charged with an output voltage Vout at the output terminal o. The feedback capacitor Cfb may be connected between the first input terminal Ni and the output terminal o of the operational amplifier OA.

In this case, the output voltage Vout of the operation amplifier OA may be defined as expressed in the following Equation (1):

$$V_{out} = \frac{(Cf + Cp) \times Vt}{Cfb} \quad (1)$$

where Vout denotes an output voltage of the operation amplifier OA, Cf denotes finger capacitance of the touch electrode TEq, Cp denotes parasitic capacitance of the touch electrode TEq, Cfb denotes a capacity of the feedback capacitor, and Vt denotes a voltage charged into each of the parasitic capacitance Cp and finger capacitance Cf of the touch electrode TEq.

The ADC 54 may be connected to the sensing capacitor Cs through a fourth switch SW4. The fourth switch SW4 may be turned on by a fourth switch signal SCS4 to control a connection between the ADC 54 and the sensing capacitor Cs. The ADC 54 may be connected to the sensing capacitor Cs during a period where the fourth switch SW4 is turned on, and thus may convert the output voltage Vout, stored in the sensing capacitor Cs, into the touch raw data TRD that is digital data. The ADC 54 may output the touch raw data TRD to the touch coordinate calculator 60.

Figure 6:
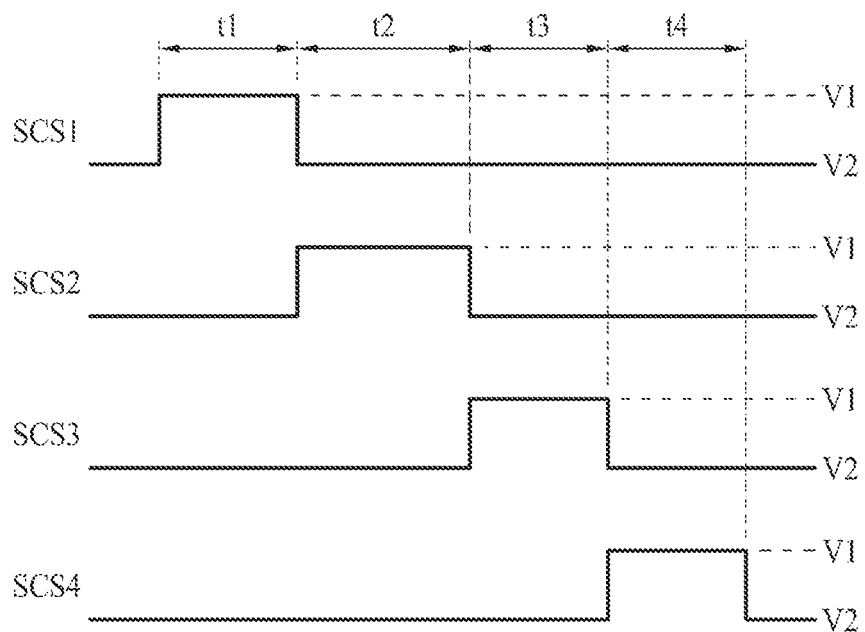
FIG. 6 is a waveform diagram showing first to fourth switch signals during first to fourth periods.

FIG. 6 is a waveform diagram showing first to fourth switch signals during first to fourth periods. Referring to FIG. 6, a second period t2 may be a period subsequent to a first period t1, a third period t3 may be a period subsequent to the second period t2, and a fourth period t4 may be a period subsequent to the third period t3. The first period t1 may be a touch driving voltage supply period, the second period t2 may be an electrical charge discharge period of the parasitic capacitance Cp of the touch electrode TEq, the third period t3 may be a period where a voltage charged into each of the parasitic capacitance Cp and finger capacitance Cf of the touch electrode TEq is sensed, and the fourth period t4 may be a period where the sensed voltage is converted into the touch raw data which is digital data. A length of each of the first to fourth periods t1 to t4 may be predetermined through experiment.

The first switch signal SCS1 may have a first logic level voltage V1 during the first period t1, and during the second to fourth periods t2 to t4, the first switch signal SCS1 may have a second logic level voltage V2. The second switch signal SCS2 may have the first logic level voltage V1 during the second period t2, and during the first, third, and fourth periods t1, t3 and t4, the second switch signal SCS2 may have the second logic level voltage V2. The third switch signal SCS3 may have the first logic level voltage V1 during the third period t3, and during the first, second, and fourth periods t1, t2 and t4, the third switch signal SCS3 may have the second logic level voltage V2. The fourth switch signal SCS4 may have the first logic level voltage V1 during the fourth period t4, and during the first to third periods t1 to t3, the fourth switch signal SCS4 may have the second logic level voltage V2.

Each of the first to fourth switches SW1 to SW4 may be turned on by the first logic level voltage V1 and may be turned off by the second logic level voltage V2. Therefore, the first switch SW1 may be turned on during the first period t1, the second switch SW2 may be turned on during the second period t2, the third switch SW3 may be turned on during the third period t3, and the fourth switch SW4 may be turned on during the fourth period t4.

Figure 7:
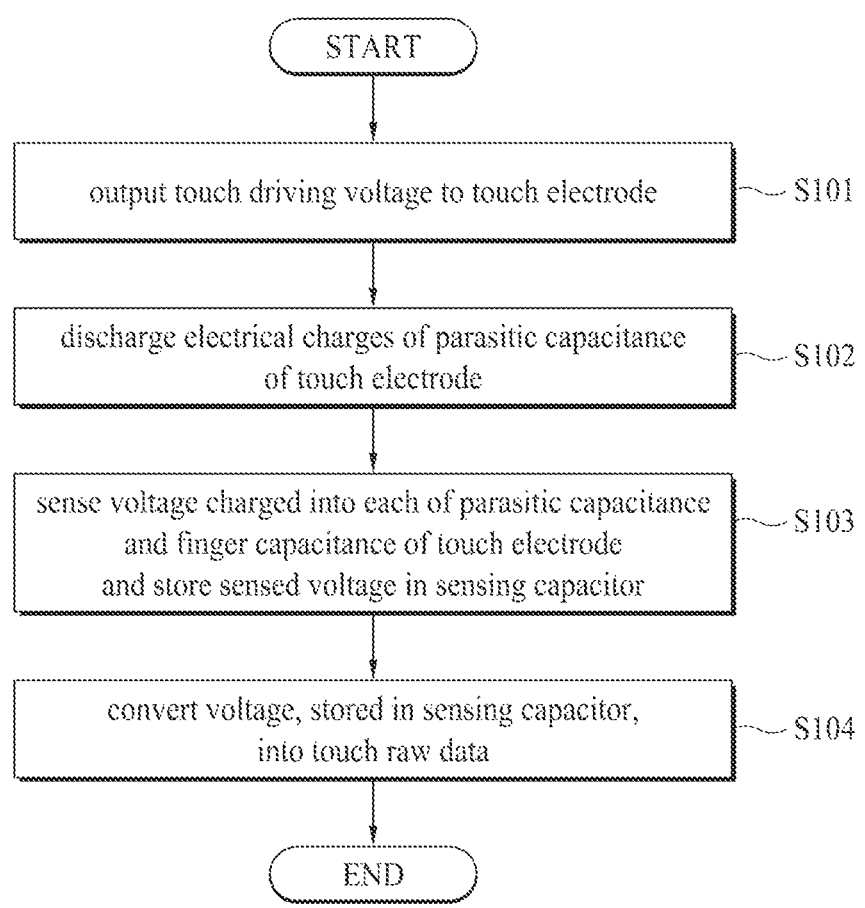
FIG. 7 is a flowchart illustrating a touch sensing method performed by a touch driver according to an embodiment of the present invention.

FIG. 7 is a flowchart illustrating a touch sensing method performed by a touch driver according to an embodiment of the present invention. FIGS. 8A to 8D are circuit diagrams illustrating the qth touch driving line of FIG. 5 and the touch driving voltage output unit, current supply source, touch voltage sensing unit, and analog-to-digital converter of the touch driver connected to the qth touch driving line during first to fourth periods. Hereinafter, the touch sensing method performed by the touch driver according to an embodiment of the present invention will be described in detail with reference to FIGS. 6, 7 and 8A to 8D.

First, in operation S101, the touch driving voltage Vd may be supplied to the touch electrode TEq during the first period t1. During the first period t1, the first switch SW1 may be turned on by the first switch signal SCS1 corresponding to the first logic level voltage V1. During the first period t1, the second to fourth switches SW2 to SW4 may be turned off.

Figure 8A:
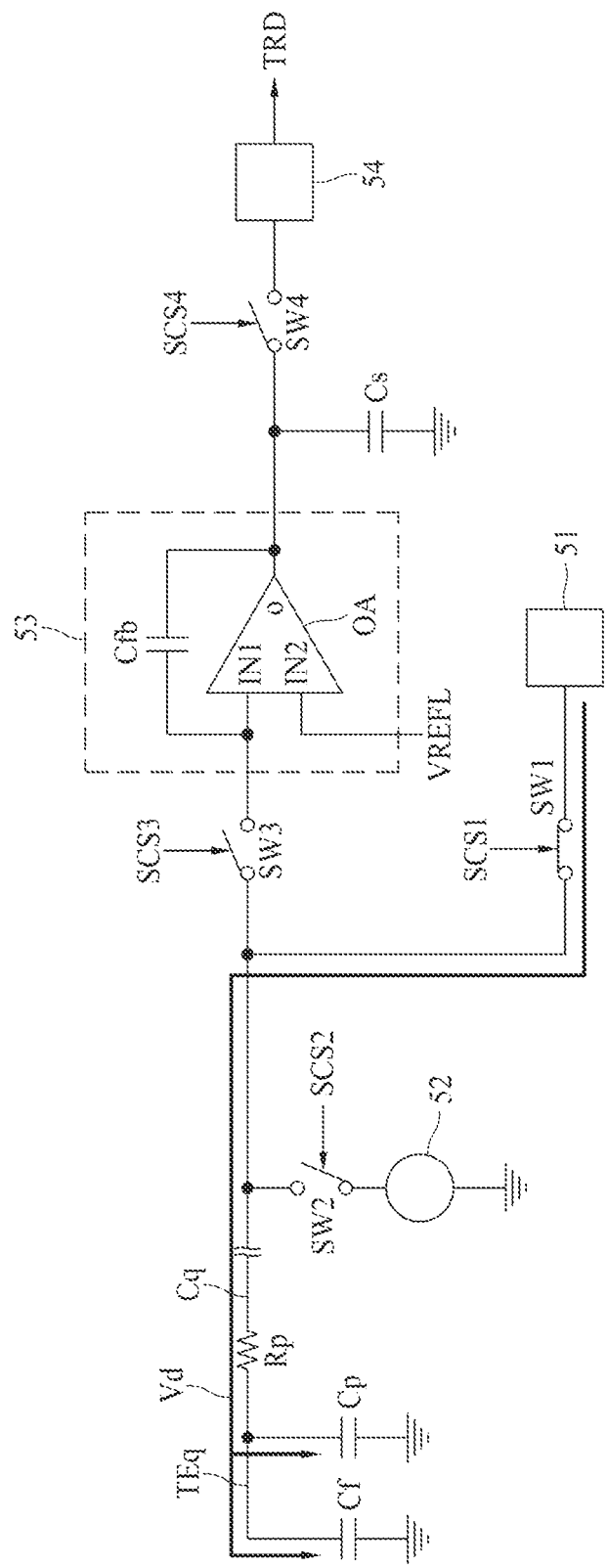
FIGS. 8A to 8D are circuit diagrams illustrating the qth touch driving line of FIG. 5 and the touch driving voltage output unit, current supply source, touch voltage sensing unit, and analog-to-digital converter of the touch driver connected to the qth touch driving line during first to fourth periods.

When the first switch SW1 is turned on, the touch driving voltage output unit 51 may be connected to the qth touch driving line Cq and may output the touch driving voltage Vd to the touch driving line Cq. The touch driving voltage Vd, as illustrated in FIG. 8A, may be charged into the parasitic capacitance Cp and finger capacitance Cf of the touch electrode TEq through the touch driving line Cq. In this case, a charged electrical charge amount Qc of each of the parasitic capacitance Cp and finger capacitance Cf of the touch electrode TEq may be defined as expressed in the following Equation (2):

$$Qc = (Cf + Cp) \times Vd \qquad (2)$$

where Qc denotes a charged electrical charge amount Qc of each of the parasitic capacitance Cp and finger capacitance Cf of the touch electrode TEq during the first period t1, Cf denotes finger capacitance of the touch electrode TEq, Cp denotes parasitic capacitance of the touch electrode TEq, and Vd denotes a touch driving voltage.

Second, in operation S102, electrical charges charged into the parasitic capacitance Cp of the touch electrode TEq may be discharged during the second period t2. During the second period t2, the second switch SW2 may be turned on by the second switch signal SCS2 corresponding to the first logic level voltage V1. During the second period t2, the first, third, and fourth switches SW1, SW3 and SW4 may be turned off.

Figure 8B:
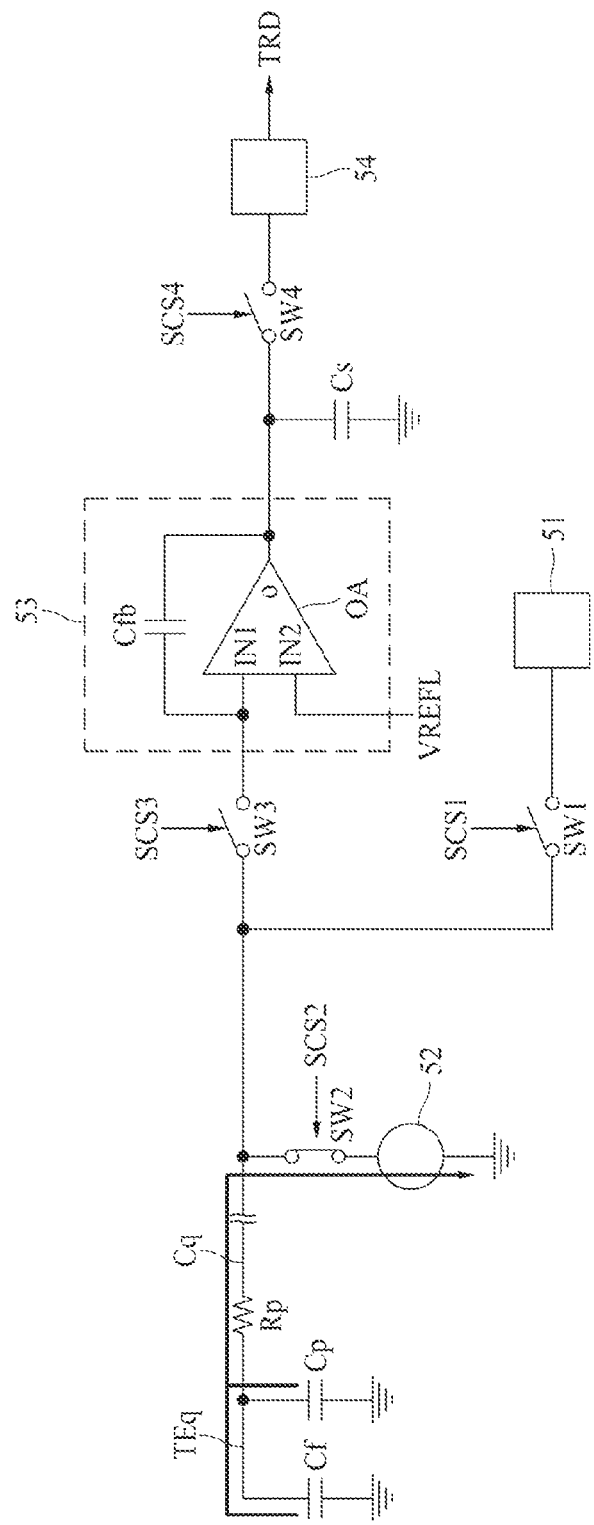

When the second switch SW2 is turned on, the current source 52 may be connected to the qth touch driving line Cq and may supply a discharge current "−id" to the touch driving line Cq. Therefore, as illustrated in FIG. 8B, some of electrical charges charged into the parasitic capacitance Cp of the touch electrode TEq may be discharged during the second period t2. That is, during the second period t2, a charged electrical charge amount Q of each of the parasitic capacitance Cp and finger capacitance Cf of the touch electrode TEq may be defined as expressed in the following Equation (3):

$$Qr = (Cf + Cp) \times Vd - id \times t2 \qquad (3)$$

where Qr denotes a charged electrical charge amount of each of the parasitic capacitance Cp and finger capacitance Cf of the touch electrode TEq which remains after discharging during the second period t2, Cf denotes finger capacitance of the touch electrode TEq, Cp denotes parasitic capacitance of the touch electrode TEq, Vd denotes the touch driving voltage, −id denotes a discharge current, and t2 denotes a length of the second period.

An electrical charge amount Qd which is discharged during the second period t2 may correspond to multiplication of the discharge current "−id" and the length of the second period t2. That is, the electrical charge amount Qd which is discharged during the second period t2 may be proportional to the discharge current "−id" and the length of the second period t2. As expressed in the following Equation (4), a difference between a charged electrical charge amount Qcp of the parasitic capacitance Cp of the touch electrode TEq and the electrical charge amount Qd which is discharged during the second period t2 may be equal to or less than ∂% of the charged electrical charge amount Qcp of the parasitic capacitance Cp of the touch electrode TEq. In this case, a may be closer to 0. ∂ may be controlled by adjusting the discharge current "−id" and the length of the second period t2, and the discharge current "−id" and the length of the second period t2 may be predetermined based on ∂ through experiment.

$$|Qcp - Qd| = Qcp \times \frac{\partial}{100}, \; Qcp = Cp \times Vd, \; Qd = -id \times t2 \qquad (4)$$

where Qcp denotes a charged electrical charge amount of the parasitic capacitance Cp of the touch electrode TEq, Qd denotes an electrical charge amount which is discharged during the second period t2, Cp denotes parasitic capacitance of the touch electrode TEq, Vd denotes the touch driving voltage, −id denotes a discharge current, and t2 denotes a length of the second period.

The following Equation (5) may be derived by arranging Equation (4):

$$Qd = Qcp \times \left(1 \pm \frac{\partial}{100}\right) \quad (5)$$

Third, the voltage Va charged into each of the parasitic capacitance Cp and finger capacitance Cf of the touch electrode TEq may be sensed during the third period t3. The third switch SW3 may be turned on by the third switch signal SCS3 corresponding to the first logic level voltage V1 during the third period t3. The first, second, and fourth switches SW1, SW2 and SW4 may be turned off during the third period t3.

Figure 8C:
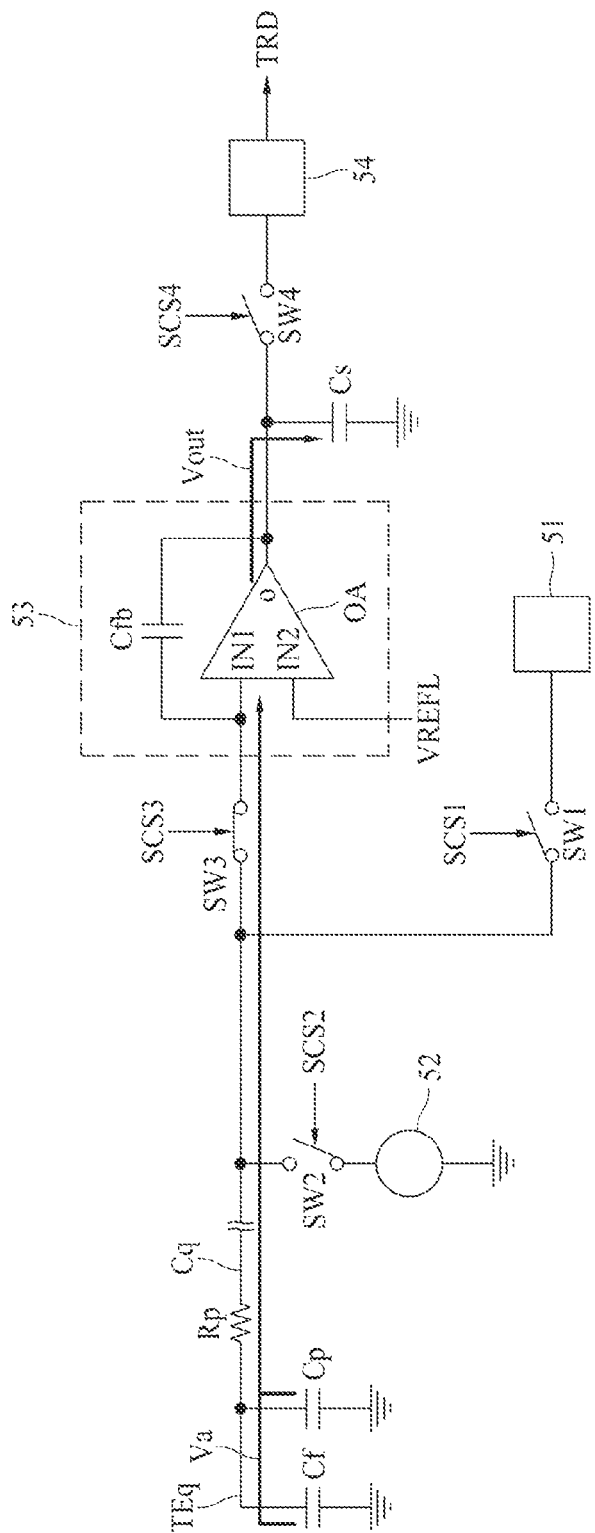

When the third switch SW3 is turned on, the touch voltage sensing unit 53 may be connected to the qth touch driving line Cq, and as illustrated in FIG. 8C, the voltage Va charged into each of the parasitic capacitance Cp and finger capacitance Cf of the touch electrode TEq may be sensed. Since some of electrical charges charged into the parasitic capacitance Cp of the touch electrode TEq are discharged during the second period t2, the voltage Va which is charged into each of the parasitic capacitance Cp and finger capacitance Cf of the touch electrode TEq during the third period t3 may be defined as expressed in the following Equation (6):

$$Va = \frac{Qr}{(Cf + Cp)} \quad (6)$$

where Va denotes a voltage which is charged into each of the parasitic capacitance Cp and finger capacitance Cf of the touch electrode TEq during the third period t3, Qr denotes a charged electrical charge amount of each of the parasitic capacitance Cp and finger capacitance Cf of the touch electrode TEq which remains during the third period t3 after discharging during the second period t2, Cf denotes finger capacitance of the touch electrode TEq, and Cp denotes parasitic capacitance of the touch electrode TEq.

In this case, the output voltage Vout which is output by the touch voltage sensing unit 53 during the third period t3 may be defined as expressed in the following Equation (7):

$$V_{out} = \frac{(Cf + Cp) \times Va}{Cfb} = \frac{(Cf + Cp)}{Cfb} \times \frac{Qr}{(Cf + Cp)} \quad (7)$$

where Vout denotes an output voltage of the operational amplifier OA of the touch voltage sensing unit 53, Cf denotes finger capacitance of the touch electrode TEq, Cp denotes parasitic capacitance of the touch electrode TEq, Cfb denotes a capacity of the feedback capacitor, Va denotes a voltage which is charged into each of the parasitic capacitance Cp and finger capacitance Cf of the touch electrode TEq during the third period t3, and Qr denotes a charged electrical charge amount of each of the parasitic capacitance Cp and finger capacitance Cf of the touch electrode TEq which remains during the third period t3 after discharging during the second period t2.

The following Equation (8) may be derived by substituting Equation (3) into Qr of Equation (7):

$$Vout \cong \frac{(Cf + Cp) \times Vd - id \times t2}{Cfb} \quad (8)$$

The following Equation (9) may be derived by substituting Equation (4) into "Cp×Vd−id×t2" of Equation (8). In the following Equation (9), for convenience of description, a case where ∂ is set to 5 will be described as an example.

$$Vout \cong \frac{(Cf \pm 0.05 \times Cp) \times Vd}{Cfb} \quad (9)$$

In operation S103, the output voltage Vout of the touch voltage sensing unit 53 may be stored in the sensing capacitor Cs.

Fourth, the output voltage Vout which is stored in the sensing capacitor Cs during the fourth period t4 may be converted into the touch raw data. The fourth switch SW4 may be turned on by the fourth switch signal SCS4 corresponding to the first logic level voltage V1 during the fourth period t4. The first to third switches SW1 to SW3 may be turned off during the fourth period t4.

Figure 8D:
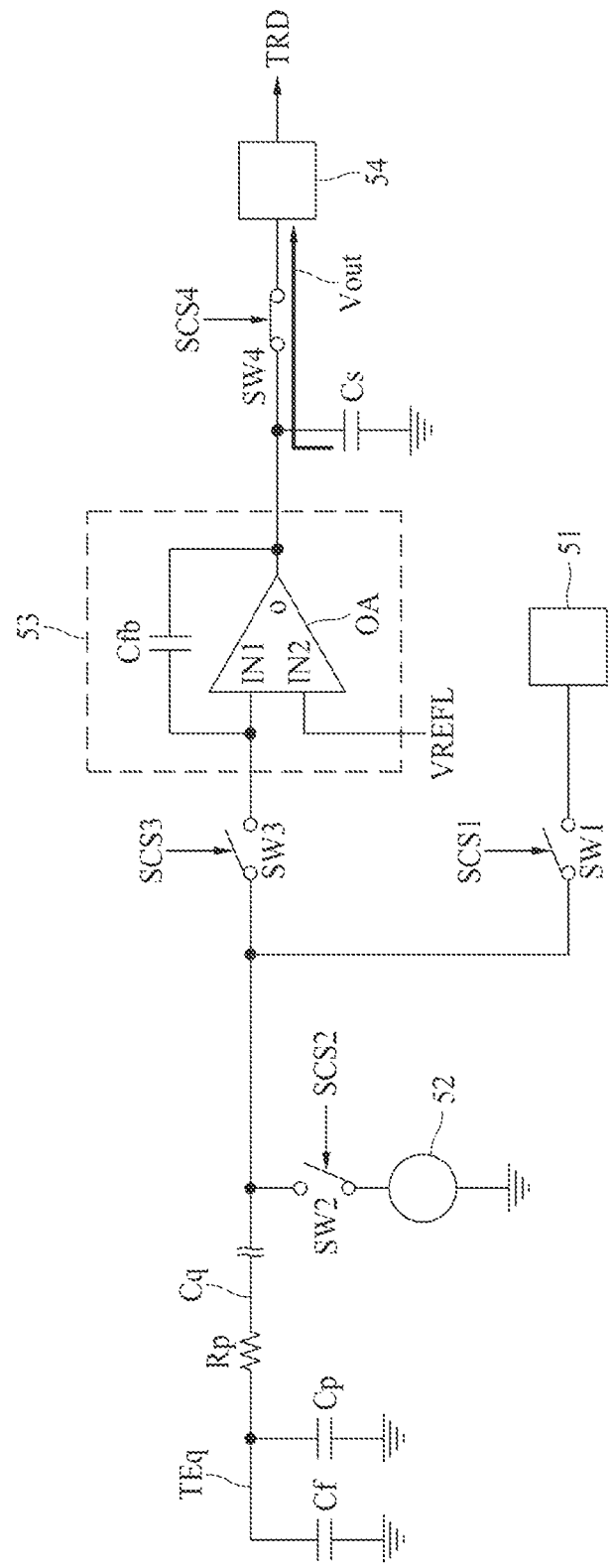

When the fourth switch SW4 is turned on, the ADC 54 may be connected to the sensing capacitor Cs, and thus, as illustrated in FIG. 8D, the output voltage Vout stored in the sensing capacitor Cs may be supplied to the ADC 54. The ADC 54 may convert the output voltage Vout into the touch raw data TRD which is digital data. The ADC 54 may output the touch raw data TRD to the touch coordinate calculator 60 in operation S104.

As described above, in the embodiments of the present invention, electrical charges of the parasitic capacitance Cp of the touch electrode TEq may be discharged to a ∂% during the second period t2. As a result, in the embodiments of the present invention, a voltage which is charged into the parasitic capacitance Cp of the touch electrode TEq during the third period t3 may be sensed as the voltage Vout which is lowered to ∂% as expressed in Equation (9). That is, in the embodiments of the present invention, an influence of the parasitic capacitance Cp of the touch electrode TEq may be minimized, and a voltage charged into the finger capacitance Cf of the touch electrode TEq may be sensed. Therefore, in the embodiments of the present invention, a change in the output voltage Vout based on the presence of the finger capacitance Cf of the touch electrode TEq increases, and thus, an accuracy of touch sensing is enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen device comprising:
a touch electrode;
a touch driving line connected to the touch electrode;
a touch driving voltage output unit connected to the touch driving line through a first switch, the touch driving voltage output unit outputting a touch driving voltage to the touch driving line that includes a plurality of sequential pulses while the touch driving voltage output unit is connected to the touch driving line via the first switch;

a current source configured to be directly connected to the touch driving line through a second switch to discharge electrical charges charged into a parasitic capacitance of the touch electrode and discharge electrical charges charged into a touch capacitance of the touch electrode according to a predetermined discharge current, wherein the parasitic capacitance is formed in the touch electrode even though the touch electrode is not touched; and a touch voltage sensing unit connected to the touch driving line through a third switch to sense a voltage charged into each of the touch capacitance and the parasitic capacitance of the touch electrode via self-capacitance touch sensing, the voltage sensed by the touch voltage sensing unit through the touch driving line.

2. The touch screen device of claim 1, wherein the touch voltage sensing unit comprises:

an operation amplifier including a first input terminal connected to the touch driving line through the third switch, a second input terminal to which a reference voltage is supplied, and an output terminal; and a feedback capacitor connected between the first input terminal and the output terminal.

3. A touch screen device comprising:

a touch electrode;

a touch driving line connected to the touch electrode;

a touch driving voltage output unit connected to the touch driving line through a first switch, the touch driving voltage output unit outputting a touch driving voltage to the touch driving line that includes a plurality of sequential pulses while the touch driving voltage output unit is connected to the touch driving line via the first switch;

a current source connected to the touch driving line through a second switch to discharge electrical charges charged into a parasitic capacitance of the touch electrode and discharge electrical charges charged into a touch capacitance of the touch electrode according to a predetermined discharge current, wherein the parasitic capacitance is formed in the touch electrode even though the touch electrode is not touched; and a touch voltage sensing unit connected to the touch driving line through a third switch to sense a voltage charged into each of the touch capacitance and the parasitic capacitance of the touch electrode via self-capacitance touch sensing, the voltage sensed by the touch voltage sensing unit through the touch driving line, wherein:

during a first period, a first switch signal corresponding to a first logic level voltage for turning on the first switch is supplied to the first switch, during a second period subsequent to the first period, a second switch signal corresponding to the first logic level voltage for turning on the second switch is supplied to the second switch, and during a third period subsequent to the second period, a third switch signal corresponding to the first logic level voltage for turning on the third switch is supplied to the third switch.

4. The touch screen device of claim 3, further comprising:

a sensing capacitor storing an output voltage of the touch voltage sensing unit; and an analog-to-digital converter connected to the sensing capacitor through a fourth switch to convert the output voltage of the touch voltage sensing unit, stored in the sensing capacitor, into touch raw data that is digital data.

5. The touch screen device of claim 4, wherein during a fourth period subsequent to the third period, a fourth switch signal corresponding to the first logic level voltage for turning on the fourth switch is supplied to the fourth switch.

6. The touch screen device of claim 4, wherein an amount of electrical charges which are discharged from the parasitic capacitance of the touch electrode during the second period is a value obtained by multiplying the discharge current and a length of the second period.

7. A method of driving a touch screen device, the method comprising:

charging a parasitic capacitance and a touch capacitance of a touch electrode with a touch driving voltage that includes a plurality of sequential pulses via a touch driving line, the parasitic capacitance and the touch capacitance charged with the touch driving voltage that includes the plurality of sequential pulses while the touch electrode is connected to the touch driving line through a first switch;

discharging electrical charges charged into the parasitic capacitance of the touch electrode and electrical charges charged into the touch capacitance of the touch electrode directly via the touch driving line, the electrical charges in the parasitic capacitance and the electrical charges in the touch capacitance discharged according to a predetermined discharge current during a predetermined period, wherein the parasitic capacitance is formed in the touch electrode even though the touch electrode is not touched; and sensing a voltage charged into each of the parasitic capacitance and the touch capacitance of the touch electrode via the touch driving line using self-capacitance touch sensing, wherein the touch driving line is shared to charge and discharge the parasitic capacitance and the touch capacitance of the touch electrode.

8. The method of claim 7, further comprising: converting the sensed voltage into touch raw data that is digital data.

9. The method of claim 7, wherein an amount of electrical charges discharged from the parasitic capacitance of the touch electrode is a value obtained by multiplying the discharge current and a length of the predetermined period.

* * * * *